United States Patent [19]

Durand

[11] 4,425,050

[45] Jan. 10, 1984

[54] FLUID-PRESSURE ACTUATED COUPLING

[76] Inventor: François Durand, 11, rue du Bateau, 06600 Antibes, France

[21] Appl. No.: 329,512

[22] Filed: Dec. 10, 1981

[30] Foreign Application Priority Data

Dec. 11, 1980 [FR] France ............................... 80 26614
Feb. 3, 1981 [FR] France ............................... 81 02616
Oct. 6, 1981 [FR] France ............................... 81 18993

[51] Int. Cl.$^3$ ...................... F16D 1/00; F16L 17/00; F16L 29/00
[52] U.S. Cl. ........................................ 403/15; 403/31; 403/368
[58] Field of Search ...................... 403/15, 16, 31, 367, 403/368, 370, 372

[56] References Cited

U.S. PATENT DOCUMENTS

| 3,033,597 | 5/1962 | Miller ................................... 403/15 |
| 3,653,691 | 4/1972 | Bram ................................ 403/368 X |
| 3,865,497 | 2/1975 | Bratt et al. ............................ 403/15 |
| 3,912,412 | 10/1975 | Struttman .......................... 403/368 |
| 4,317,596 | 3/1982 | Lemmon ................................ 403/16 |

FOREIGN PATENT DOCUMENTS 567191 9/1975 Switzerland ........................... 403/15

Primary Examiner—W. L. Shedd
Attorney, Agent, or Firm—Karl F. Ross; Herbert Dubno

[57] ABSTRACT

A pressure coupling for securing a part to a shaft rotatable about and centered on the axis has an inner sleeve fitted snugly over the shaft and in good contact therewith and having a pair of axially outwardly flared frustoconical outer surfaces centered on the axis. An outer piston ring and a separate outer cylinder ring on the sleeve respectively have outwardly flared frustoconical inner surfaces flatly engaging the outer surfaces and axially limitedly slidable thereon. The rings are displaceable axially relative to each other between juxtaposed inner positions relatively close to each other and bearing at most lightly on the outer surfaces and spaced-apart outer positions bearing strongly on the outer surfaces and radially inwardly deforming the sleeve against the shaft. The cylinder ring overreaches the piston ring and forms therewith a substantially closed pressurizable chamber. One of the rings is formed with a passage having one end at the chamber and another end and one of the rings is rotationally secured to the part. The inner and outer surfaces have half angles slightly bigger than their respective friction angles, normally above 8°. The chamber can be pressurized to urge the rings into the outer positions, and a locking element is engageable between the rings for locking same in the outer positions.

16 Claims, 7 Drawing Figures

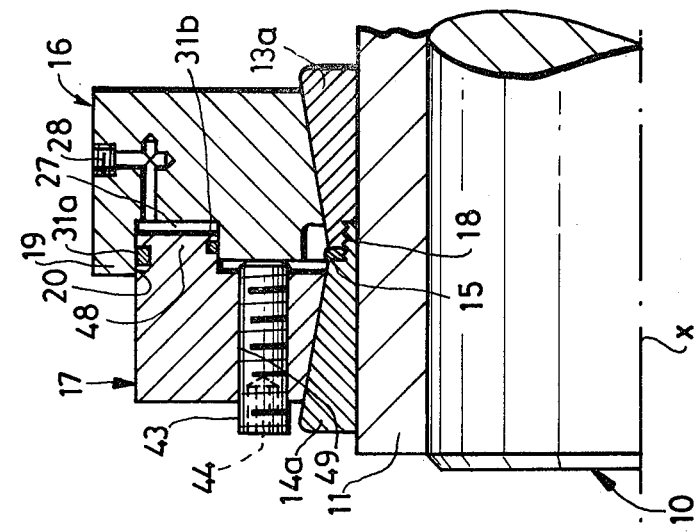
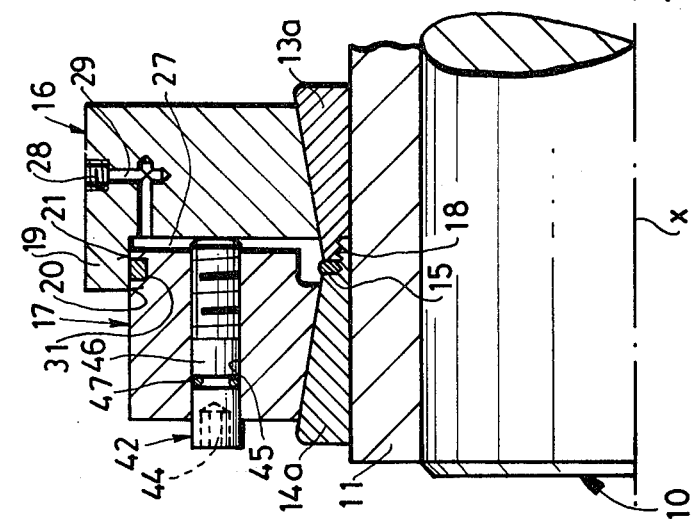
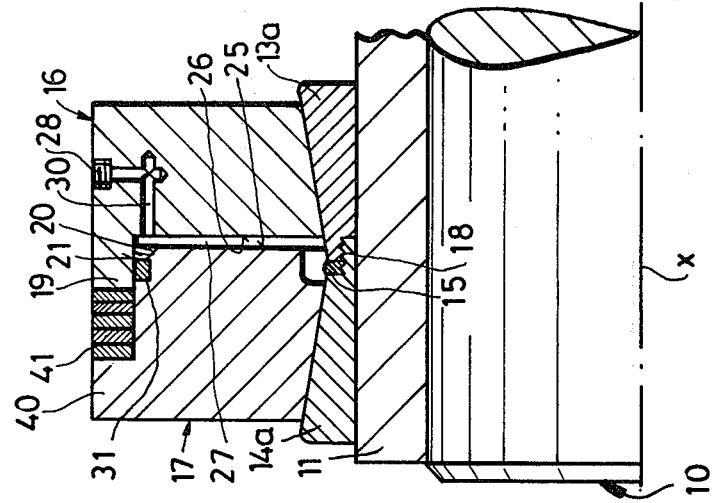

FLUID-PRESSURE ACTUATED COUPLING

FIELD OF THE INVENTION

The present invention relates to a fluid-pressure actuated coupling of the type used to connect a rotary shaft to a part such as a pulley or another shaft. More particularly this invention concerns such a coupling used to releasably but fixedly connect such a part onto the shaft.

BACKGROUND OF THE INVENTION

It is known to connect a shaft to another shaft or to a hub of a wheel or pulley by means of a fluid-pressure actuated coupling that merely creates a pressure or interference fit between the two parts being joined. Such an arrangement, as described in U.S. Pat. No. 3,865,497 to A. E. Bratt et al., has a frustoconically tapered surface on the shaft or on a collar used to join two shafts. A complementarily shaped bore of a sleeve can be fitted over this surface. One end of the sleeve is formed at the narrow end of the frustoconical surface with an axially outwardly and radially inwardly open groove. A ring threaded on the shaft or collar and a seal washer axially close off this groove, which is radially inwardly closed by the shaft or collar to form a closed annular chamber that can be vented through a normally sealed bleed opening. The sleeve is formed at the frustoconical surface engaging the shaft with a radially inwardly open groove to which hydraulic fluid is fed under high pressure, so that it will seep axially along between the frustoconical surface and the sleeve and will eventually pressurize the annular chamber, thereby urging the sleeve toward the bigger end of the frustoconical surface to tighten the coupling. To release the coupling the vent hole is opened so the flow of oil between the sleeve and frustoconical surface reduces the friction between them sufficiently to slide the sleeve back toward the smaller end of the frustoconical surface. This system is a variation on the systems described in U.S. Pat. Nos. 3,228,102 of R. E. Sillett and 3,531,146 of N. A. Blad and A. E. Bratt.

In this arrangement when the collar is used to join two shafts it is impossible to obtain the same clamping pressure on both shaft ends. The thicker part of the collar will not be radially inwardly deformed as the thinner part so that the shaft end gripped thereby will be less forcibly held. After having been in use a long time it is frequently very difficult to open up the coupling, particularly when, as is common, the various parts have bitten mechanically into one another. Thus it is standard practice to open up such a coupling after a long time in use by means of a hydraulic gear puller. The coupling must, in addition, be machined extremely precisely for an exact surface-contact fit between the frustoconical surfaces. Such production makes the coupling quite exensive.

OBJECTS OF THE INVENTION

It is therefore an object of the present invention to provide an improved fluid-pressure actuated-fit coupling.

Another object is the provision of such a fluid-pressure actuated-fit coupling which overcomes the above-given disadvantages.

A further object is to provide a fluid-pressure actuated-fit coupling which can be produced at low cost, which is easy to use, and which can be counted on to open and release after having been locked for a long time.

SUMMARY OF THE INVENTION

These objects are attained according to the instant invention in a fluid-pressure actuated coupling for securing a part to a shaft rotatable about and centered on the axis. The coupling has an inner sleeve fitted snugly over the shaft and in good contact therewith and having a pair of axially outwardly flared frustoconical outer surfaces centered on the axis. An outer piston ring and a separate outer cylinder ring on the sleeve respectively have outwardly flared frustoconical inner surfaces flatly engaging the outer surfaces and axially limitedly slidable thereon. The rings are displaceable axially relative to each other between juxtaposed inner positions relatively close to each other and bearing at most lightly on the outer surfaces and spaced-apart outer positions bearing strongly on the outer surfaces and radially inwardly deforming the sleeve against the shaft. The cylinder ring overreaches the piston ring and forms therewith a substantially closed pressurizable chamber. One of the rings is formed with a passage having one end at the chamber and another end and ne of the rings is rotationally secured to the part. The inner and outer surfaces have half angles slightly bigger than their respective friction angles, normally above 8°. Means is provided at the other end of the passage for pressurizing the chamber therethrough and thereby urging the rings into the outer positions, and means including at least one locking element is engageable between the rings for locking same in the outer positions.

With this system the forces opening the coupling will be symmetrically opposite. These forces will surely open the coupling even if it has been locked on the respective parts for a long time.

According to another feature of this invention the sleeve is formed by a pair of similar end sleeve parts respectively having the outer surfaces and having connected-together axially confronting ends. Such an arrangement permits the coupling to be loaded with great hydraulic pressure.

This connection can be made by forming the sleeve parts at their the ends with interengaging screwthreads. It is also possible to hold the sleeve parts axially together on the shaft by means of at least one threaded nut securing the sleeve parts axially together. When the sleeve includes a central sleeve part lying between the end sleeve parts it can be secured thereto by respective such threaded nuts, the central part lying radially within the end sleeve parts and having an outwardly projecting ridge lying axially between the confronting ends.

The locking member according to this invention is a nut threaded on one of the rings and axially engageable with the other of the rings. Since the system according to the instant invention is pressurized directly in the chamber, rather than via the interface between the parts, it is possible to screw the nut tight to lock the coupling at the instant the hydraulic pressurization is at the desired level. In the prior-art systems the pressurization of the chamber must be constantly renewed by addition of fluid since there is substantial leakage between the parts.

It is also possible, when the rings have axially confronting surfaces outside the chamber, for the locking element to be a plurality of spacer-shims between the confronting surfaces.

In accordance with the instant invention one of the rings is formed with a plurality of angularly spaced and axially extending threaded bores and the other of the rings is formed with an abutment face confronting the bores. The locking element includes a plurality of screws engaged in the bores and bearing axially against the abutment face. This abutment face can be inside or outside the chamber.

When, according to this invention, the part is a second shaft coaxial with the first-mentioned shaft, the sleeve includes a central sleeve part fitted axially over both of the shafts and a pair of end sleeve parts. The intermediate and end parts form two such pairs of axially outwardly flared frustoconical surfaces, with the end parts each surrounding a respective shaft and being provided with respective such cylinder and piston rings. In addition these end parts each form one respective outer surface and are fixed on the intermediate part. It is also possible for one of each of the pairs of outer surfaces to be integrally formed in the intermediate part. The end parts can be secured to the intermediate parts by threaded nuts. The end parts can also be heat-shrunk onto the intermediate part. In order to reduce the possibility of failure of the intermediate part at the region directly beteen the two shaft ends, it is formed with a radially inwardly open groove directly between the shafts.

DESCRIPTION OF THE DRAWING

The above and other features and advantages will become more readily apparent from the following, reference being made to the accompanying drawing in which:

FIGS. 5-7 are axial sections through further couplings according to this invention.

SPECIFIC DESCRIPTION

Figure 1:
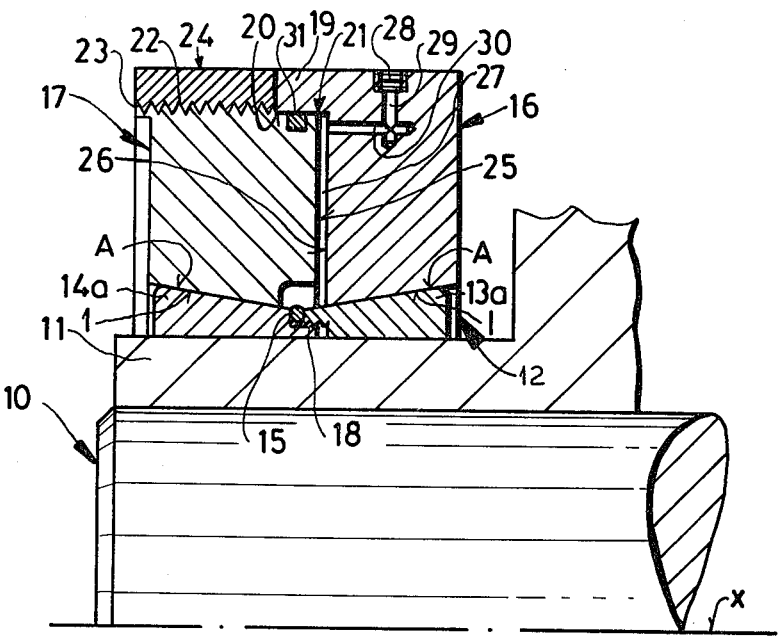
FIGS. 1 and 2 are axial sections through couplings according to the invention between a shaft and a pulley or gear.

As seen in FIG. 1 a coupling according to the instant invention is used to interconnect a shaft 10 centered on an axis x and having a cylindrical outer surface and another part constituted as a pulley, gear, or wheel 11 having a cylindrical bore and fitted snugly over the shaft 10, again centered on the axis x. The portion of the wheel 11 engaged by the coupling according to this invention is radially elastically deformable inwardly so that it can be brought into tight surface or flat contact with the outer surface of the shaft 10 for a tight interference fit.

According to this invention a sleeve 12 formed by a pair of similar ring parts 13a and 14a are snugly fitted in turn over the wheel 11. A seal 15 engages between the axially confronting edges of the rings 13a and 14a and interengaging screwthreads 18 axially fix them relative to each other. The rings 13a and 14a are formed with identical but oppositely inclined outwardly flared frustoconical outer surfaces A centered on the axis x.

Figure 4:
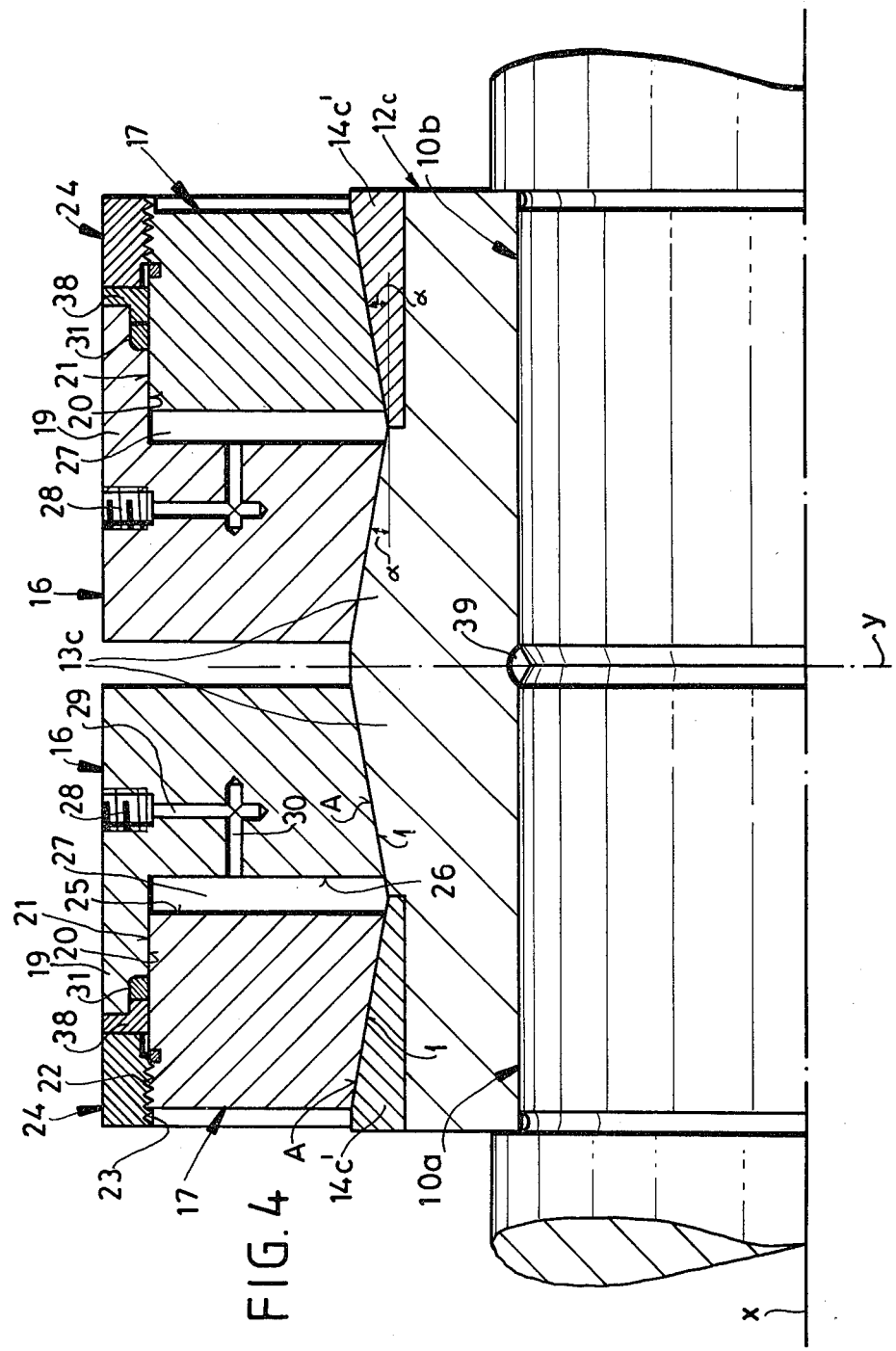

A cylinder ring 16 and a piston ring 17 have identical but oppositely inclined outwardly flared frustoconical inner surfaces I centered on the axis x and limitedly axially slidable on the surfaces A. The half angles of these surfaces A and I (shown at alpha in FIG. 4), that is the angle they form with the axis x, is slightly larger than the slide angle between the surfaces A and I, assuming they are clean, smooth, and well lubricated. The cylinder ring 16 is formed with an annular rim 19 overreaching the piston ring 17 so that the confronting faces 25 and 26 of the piston 17 and cylinder ring 16 form a pressurizable compartment 27. A seal ring 31 recessed in the outer surface 21 of the piston ring 17 bears radially outwardly on the inner surface 20 f the rim 19 to seal the compartment 17 at this location.

The cylinder ring 16 is formed with bores 29 and 30 that form a passage that opens at one end into the chamber 28 and at the other end is formed with a threaded seat 28 into which a hydraulic coupling can be screwed as will be described below.

The piston ring 17 is formed externally with a screwthread 22. A locking ring or nut 24 has an internal screwthread 23 that engages over this thread 22. Thus this nut 24 can be screwed on the piston ring 17 to bear axially against the rim 19 of the cylinder ring 16.

In use the wheel 11 is first slid over the shaft 10. Then an assembly comprising the sleeve 12, the rings 16 and 17, and the nut 24 is slid over the wheel 11, with the faces 25 and 26 of the rings 16 and 17 flatly engaged.

The nut 24 is then turned by hand or with tools such as a wrench or a hammer and punch until it is tight. A high-pressure hydraulic hose is then screwed into the recess 28 at the end of the passage 29, 30 and the chamber 27 is pressurized with hydraulic liquid under very high pressure. This action drives the two rings 16 and 17 apart so that the surfaces A and I wedge and deform the sleeve 12 and wheel 11 radially inward to lock the entire arrangement together with a good interference fit between the shaft 10 and wheel 11. Since there are no seals between the surfaces A and I a small amount of hydraulic liquid, mainly a light oil, will move and even leak out between these surfaces A and I making them able to slide on each other readily.

Once the rings 16 and 17 are in this outer position with the chamber 27 pressurized, the nut 24 is screwed in again into very tight axial contact with the rim 17 so as mechanically to lock these rings 16 and 17 relative to each other. The hydraulic pressurizing hose can then be disconnected and the seat 28 plugged to keep it clean, but not to maintain pressure in the chamber 27.

To decouple the shaft 10 and wheel 11 the recess 28 is unplugged and the chamber 27 is repressurized, but normally at a pressure slightly higher than that used originally so that the rings 16 and 17 move a tiny bit further apart than earlier to free the nut 24. This nut 24 is then screwed back so that when the pressure is removed the two rings 16 and 17 can move back into the inner positions and the arrangement can be disassembled.

Figure 2:
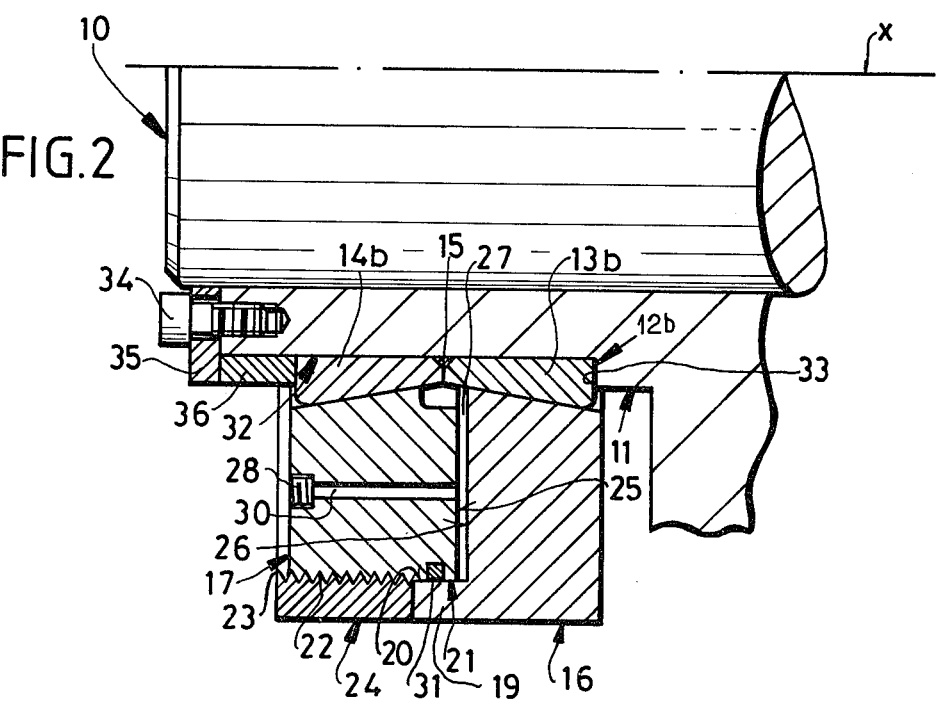
Figure 3:
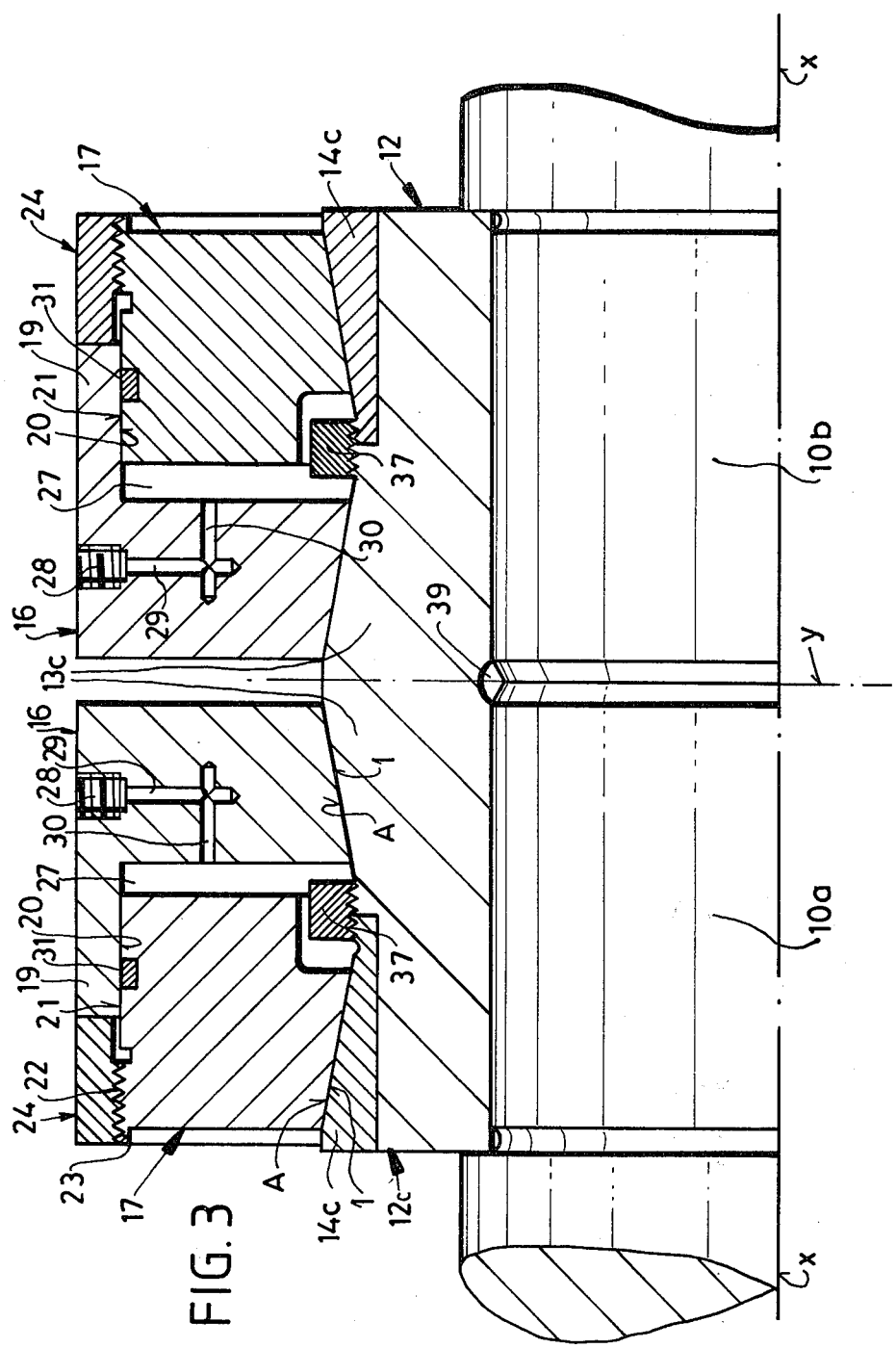
FIGS. 3 and 4 are axial sections through couplings according to the instant invention between two coaxial shafts.

The arrangement of FIG. 2 is substantially identical to that of FIG. 1, with reference numerals from FIG. 1 being used for functionally identical structure, except that here a sleeve 12b has two sleeve parts 13b and 14b are not screwed together as at 18, but are merely axially clamped together. To this end the wheel 11 has a hub having an outer surface 32 and formed with a shoulder 33 against which the sleeve part 13b bears axially in one direction. Machine screws 34 secure a washer 35 to the wheel 11. This washer 35 bears via a spacer 36 on the sleeve part 14b in the opposite axial direction. Otherwise in this arrangement the only difference is that the radial bore 29 is eliminated and the threaded recess 28 is in the passage-forming axial bore 30.

The system according to the instant invention can be produced at relatively low cost. At the same time it is operated easily. It can be counted on to open up and release the part or parts it secures together, even after having been closed for a long time.

I claim:

1. A fluid-pressure actuated coupling for securing a part to a shaft rotatable about and centered on an axis, said coupling comprising:

an inner sleeve fitted snugly over said shaft and in good contact therewith and having a pair of axially outwardly flared frustoconical outer surfaces centered on said axis;

an outer piston ring and a separate outer cylinder ring on said sleeve respectively having outwardly flared frustoconical inner surfaces engaging said outer surfaces in surface contact and axially limitedly slidable thereon, said rings being displaceable axially relative to each other between juxtaposed inner positions relatively close to each other and bearing at most lightly on said outer surfaces and spaced-apart outer positions bearing strongly on said outer surfaces and deforming said sleeve radially inward against said shaft, said cylinder ring overreaching said piston ring and forming therewith a substantially closed pressurizable chamber, one of said rings being formed with a passage having one end at said chamber and another end and one of said rings being rotationally secured to said part, said inner and outer surfaces having half angles slightly bigger than their respective friction angles;

means at said other end of said passage for pressurizing said chamber therethrough and thereby urging said rings into said outer positions;

means including at least one locking element engageable between said rings for locking same in said outer positions.

2. The coupling defined in claim 1 wherein said sleeve is formed by a pair of similar end sleeve parts respectively having said outer surfaces and having connected-together axially confronting ends.

3. The coupling defined in claim 2 wherein said sleeve parts are formed at their said ends with interengaging screwthreads.

4. The coupling defined in claim 2, further comprising means for holding said sleeve parts axially together on said shaft.

5. The coupling defined in claim 2, further comprising at least one threaded nut securing said sleeve parts axially together.

6. The coupling defined in claim 5 wherein said sleeve includes a central sleeve part lying between said end sleeve parts and secured thereto by respective such threaded nuts, said central part lying radially within said end sleeve parts and having an outwardly projecting ridge lying axially between said confronting ends.

7. The coupling defined in claim 1 wherein said locking element is a nut threaded on one of said rings and axially engageable with the other of said rings.

8. The coupling defined in claim 1 wherein said rings have axially confronting surfaces outside said chamber, said locking element including a plurality of spacer-shims between said confronting surfaces.

9. The coupling defined in claim 1 wherein one of said rings is formed with a plurality of angularly spaced and axially extending threaded bores and the other of said rings is formed with an abutment face confronting said bores, said locking element including a plurality of screws engaged in said bores and bearing axially against said abutment face.

10. The coupling defined in claim 9 wherein said abutment face is outside said chamber.

11. The coupling defined in claim 1 wherein said part is a second shaft coaxial with the first-mentioned shaft, said sleeve including a central sleeve part fitted axially over both of said shafts and a pair of end sleeve parts, said intermediate and end parts forming two such pairs of axially outwardly flared frustoconical surfaces, said end parts each surrounding a respective shaft and being provided with respective such cylinder and piston rings.

12. The coupling defined in claim 11 wherein said end parts each form one respective outer surface, said end parts being fixed on said intermediate part.

13. The coupling defined in claim 12 wherein one of each of said pairs of outer surfaces is integrally formed in said intermediate part.

14. The coupling defined in claim 12, further comprising threaded nuts securing said end parts on said intermediate part.

15. The coupling defined in claim 12 wherein said end parts are heat-shrunk onto said intermediate part.

16. The coupling defined in claim 11 wherein said intermediate part is formed with a radially inwardly open groove directly between said shafts.

* * * * *